United States Patent [19]

Hill

[11] Patent Number: 5,487,009

[45] Date of Patent: Jan. 23, 1996

[54] METHOD FOR DETERMINING THE COURSE OF A LAND VEHICLE BY COMPARING SIGNALS FROM WHEEL SENSORS WITH SIGNALS OF A MAGNETIC SENSOR

[75] Inventor: Heidebrecht Hill, Remchingen Noe, Germany

[73] Assignee: Robert Bosch GmbH, Stuttgart, Germany

[21] Appl. No.: 50,228

[22] PCT Filed: Nov. 5, 1991

[86] PCT No.: PCT/DE91/00856

§ 371 Date: May 5, 1993

§ 102(e) Date: May 5, 1993

[87] PCT Pub. No.: WO92/08953

PCT Pub. Date: May 29, 1992

[30] Foreign Application Priority Data

Nov. 7, 1990 [DE] Germany ............ 40 35 370.2

[51] Int. Cl.$^6$ ............ G06F 15/50; G01C 21/20
[52] U.S. Cl. ............ 364/449; 364/450; 364/457; 364/571.01; 342/357; 342/451; 318/587
[58] Field of Search ............ 364/449, 444, 364/450, 457, 453, 559, 571.01; 318/587; 340/988, 995; 342/451, 357; 33/319, 356, 357; 180/79.2, 140, 141; 324/226, 247, 260

[56] References Cited

U.S. PATENT DOCUMENTS

| | | | |
|---|---|---|---|
| 4,032,758 | 6/1977 | Lewis | 33/319 |
| 4,673,878 | 6/1987 | Tsushima et al. | 324/226 |
| 4,734,863 | 3/1988 | Honey et al. | 364/449 |
| 4,791,574 | 12/1988 | Thoone et al. | 364/457 |
| 4,862,398 | 8/1989 | Shimizu et al. | 364/571.05 |
| 5,040,122 | 8/1991 | Neukirchner et al. | 364/449 |
| 5,058,023 | 10/1991 | Kozikaro | 364/450 |

FOREIGN PATENT DOCUMENTS

| | | |
|---|---|---|
| 0194802A | 9/1986 | European Pat. Off. . |
| 0218273A | 4/1987 | European Pat. Off. . |
| 0359150A | 3/1990 | European Pat. Off. . |

*Primary Examiner*—Kevin J. Teska
*Assistant Examiner*—Tan Nguyen
*Attorney, Agent, or Firm*—Frishauf, Holtz, Goodman, Langer & Chick

[57] ABSTRACT

In a method for determining the location of a land vehicle wherein the driving distance and course changes are derived from wheel pulses generated by sensors in the course of the revolution of the wheels of a vehicle axle by respectively a preset angle, the course changes derived from the wheel pulses are compared with comparison course changes which are obtained independently of the wheel pulses. Correction values are derived from the result of the comparison. The comparison course changes are preferably detected with the aid of a magnetic sensor (compass).

11 Claims, 5 Drawing Sheets

| v | MAXIMUM VALUE OF RATE OF CHANGE | CORRECTING FACTORS | | | | | | | | |
|---|---|---|---|---|---|---|---|---|---|---|
| v < 40 | $\delta a_{max}(0)$ | $\delta a_{maxdyn}(0)$ | $C(0,-4)$ | $C(0,-3)$ | $C(0,-2)$ | $C(0,-1)$ | $C(0,1)$ | $C(0,2)$ | $C(0,3)$ | $C(0,4)$ |
| v < 70 | $\delta a_{max}(1)$ | $\delta a_{maxdyn}(1)$ | $C(1,-4)$ | $C(1,-3)$ | $C(1,-2)$ | $C(1,-1)$ | $C(1,1)$ | $C(1,2)$ | $C(1,3)$ | $C(1,4)$ |
| v < 100 | $\delta a_{max}(2)$ | $\delta a_{maxdyn}(2)$ | $C(2,-4)$ | $C(2,-3)$ | $C(2,-2)$ | $C(2,-1)$ | $C(2,1)$ | $C(2,2)$ | $C(2,3)$ | $C(2,4)$ |
| v < 130 | $\delta a_{max}(3)$ | $\delta a_{maxdyn}(3)$ | $C(3,-4)$ | $C(3,-3)$ | $C(3,-2)$ | $C(3,-1)$ | $C(3,1)$ | $C(3,2)$ | $C(3,3)$ | $C(3,4)$ |
| v < 160 | $\delta a_{max}(4)$ | $\delta a_{maxdyn}(4)$ | $C(4,-4)$ | $C(4,-3)$ | $C(4,-2)$ | $C(4,-1)$ | $C(4,1)$ | $C(4,2)$ | $C(4,3)$ | $C(4,4)$ |
| v < 190 | $\delta a_{max}(5)$ | $\delta a_{maxdyn}(5)$ | $C(5,-4)$ | $C(5,-3)$ | $C(5,-2)$ | $C(5,-1)$ | $C(5,1)$ | $C(5,2)$ | $C(5,3)$ | $C(5,4)$ |
| v < 220 | $\delta a_{max}(6)$ | $\delta a_{maxdyn}(6)$ | $C(6,-4)$ | $C(6,-3)$ | $C(6,-2)$ | $C(6,-1)$ | $C(6,1)$ | $C(6,2)$ | $C(6,3)$ | $C(6,4)$ |
| v < 250 | $\delta a_{max}(7)$ | $\delta a_{maxdyn}(7)$ | $C(7,-4)$ | $C(7,-3)$ | $C(7,-2)$ | $C(7,-1)$ | $C(7,1)$ | $C(7,2)$ | $C(7,3)$ | $C(7,4)$ |
| v < 280 | $\delta a_{max}(8)$ | $\delta a_{maxdyn}(8)$ | $C(8,-4)$ | $C(8,-3)$ | $C(8,-2)$ | $C(8,-1)$ | $C(8,1)$ | $C(8,2)$ | $C(8,3)$ | $C(8,4)$ |
| v ≥ 280 | $\delta a_{max}(9)$ | $\delta a_{maxdyn}(9)$ | $C(9,-4)$ | $C(9,-3)$ | $C(9,-2)$ | $C(9,-1)$ | $C(9,1)$ | $C(9,2)$ | $C(9,3)$ | $C(9,4)$ |

FIG. 10

METHOD FOR DETERMINING THE COURSE OF A LAND VEHICLE BY COMPARING SIGNALS FROM WHEEL SENSORS WITH SIGNALS OF A MAGNETIC SENSOR

BACKGROUND OF THE INVENTION

The invention is based on a method with the species of the dead-reckoning navigation, corrected by magnetic sensor and odometer signals.

In known location determination systems for vehicles, information regarding the respectively driven distance is derived from the revolution of the wheels, while in some systems a magnetic sensor detects the course and in other systems a measurement of the difference of the wheel revolutions detects the change of the course. Both methods have disadvantages. The magnetic sensor often experiences interference—for example because of steel structures close to the path of the vehicle or because of changes of the magnetic properties of the vehicle. Since errors in detecting path changes with the aid of wheel pulses accumulate in the course of driving the vehicle, large inaccuracies result with increasing length of the drive. But deviations of the course changes determined with the aid of the wheel pulses from the actual values occur for many reasons. For example, the diameters of the two wheels do not agree, or the effective axle width changes with the degree of turning and the load on the vehicle. Accordingly, differences in the wheel pulses already occur with straight-ahead driving, and the deviations during cornering are added.

A further difficulty in connection with the known systems lies in that the wheel sensors employed deliver a limited number of pulses per wheel revolution for reasons of cost and because of the severe operating conditions in the vehicle. It is therefore advantageous to use the sensors of an anti-locking system, for example, which only supply 96 pulses per wheel revolution.

SUMMARY OF THE INVENTION

It is the object of the invention to recite a method for determining the location of a land vehicle, wherein the evaluation of the wheel pulses generated by the revolution of the wheels on a vehicle axle is improved over the known systems. It is intended in particular to correct the deviations on account of the tires, the design of the axle and the operational status of the vehicle. This object is to be attained with as small as possible an effort of time and calculations.

The method has the advantage that the inaccuracies present during evaluation of the wheel pulses are corrected. In this case correction takes place adaptively. Changes occurring during the life of the vehicle or the tires are taken into consideration without readjustments needing to be made by the user or in the shop.

A further development of the invention consists in that the course changes and the comparison course changes are observed over an observation course over which the vehicle is driven, which is divided into a number of observation windows and the length of which is a function of speed, and that over an observation course started for a defined purpose (recognition of straight-ahead driving, recognition of the sign of a course change, evaluation of cornering) observation is terminated and a new observation course is started if it becomes apparent after summation within an observation window that the purpose is no longer served. This further development allows extensive use of straight and curved paths for the respective observation.

By means of another further development it is provided that during comparison course changes over one observation course which is small in respect to a preset value, a correction value is derived from the difference in the number of wheel pulses of both wheels, and that the correction value is stored and is used for the correction of the number of wheel pulses of at least one of the wheels.

This further improvement makes an effective correction of the wheel pulses during straight-ahead driving possible. In particular, errors are being corrected which are caused by different sizes of the circumference of the wheels. This correction is particularly important, because deviations from the straight-ahead driving in respect to actual straight-ahead driving add up to considerable distance and position errors over extended driving distances. In addition, further evaluations require wheels of the same size, so that other values, which will be described later, are also affected by this error.

Another further development of the invention consists in that during course changes over an observation course which are greater than a preset minimum value, the difference between the course changes and the comparison course changes is calculated, that stored correction factors are increased, if the course changes are less than the comparison course changes, that the correction factors are reduced if the course changes are greater than the comparison course changes, that the correction factors for different driving operations changed in this manner and respectively determined by a speed range and a course change range are stored and that the derived course change during the respective driving operation is weighted with the changed, stored correction factor.

A quite exact determination of course changes is possible with the help of this further development although, besides the change of the effective axle width, during cornering numerous effects falsify the values obtained from the evaluation of the wheel pulses.

In an advantageous embodiment of this further development, the correction factors for both signs of the course changes are separately determined and stored. Actually, with sufficiently symmetrical behavior of the vehicle a mutual determination and memorization of the correction factors for course changes which are of the same value, but are in a different direction, is possible.

BRIEF DESCRIPTION OF THE DRAWING

Exemplary embodiments of the invention are illustrated in the drawings by means of several drawing figures and will be described in detail in the following description. Shown are in:

FIG. 1 a schematic view of an arrangement for executing the method of the invention, FIG. 2 a block diagram of an arrangement for executing the method of the invention with the aid of a microcomputer, FIG. 3 an illustration of the course of a vehicle, FIG. 4 a table containing the information collected in a loop memory during driving over the course, FIG. 5 an illustration of the data respectively to be stored during observation, FIG. 6 a flow diagram to clarify the method for correcting the wheel pulses, FIG. 7 a schematic view of several curves, FIG. 8 a flow diagram to clarify the method of correction during cornering, FIG. 9 an illustration of the dependence of the maximum course change from the speed, and FIG. 10 a table containing stored correction factors.

In the drawings, like parts are given the same reference numerals.

DETAILED DESCRIPTION

Figure 1:
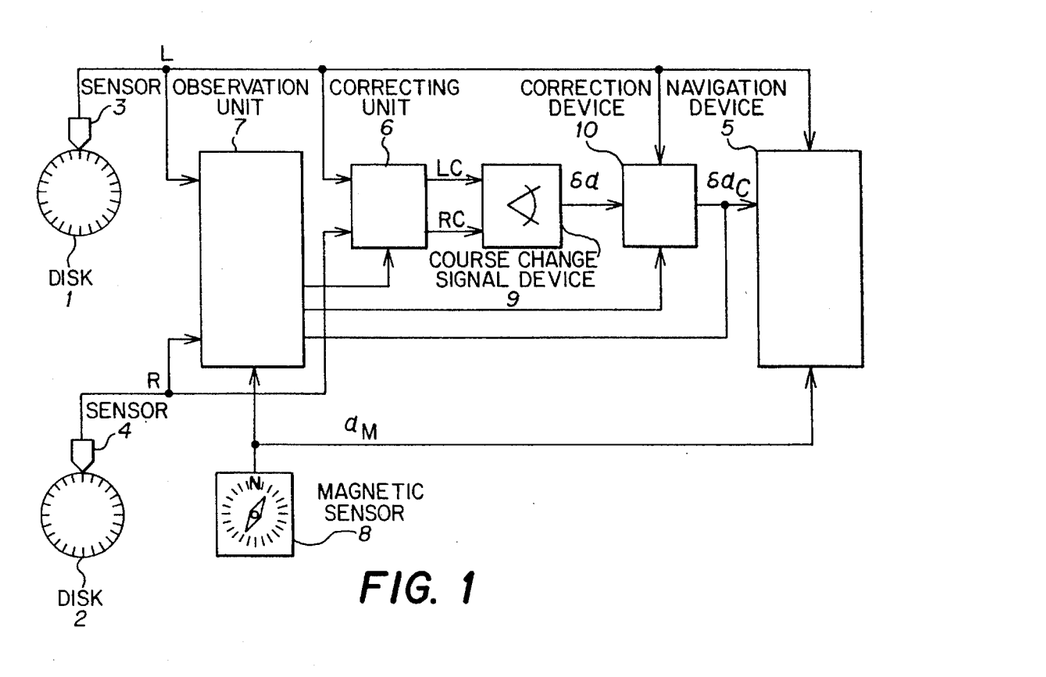

In the arrangement in accordance with FIG. 1, disks 1, 2 with a magnetic division, which is respectively scanned by a sensor 3, 4, are assigned to the non-driven wheels of a vehicle for generating the wheel pulses. Such devices are already present in vehicles with an anti-locking system and generate 96 pulses per wheel revolution. In the exemplary embodiment illustrated in FIG. 1, the wheel pulses L of the sensor 3 associated with the left wheel are supplied in the form of path pulses to a navigation device 5 which forms vectors from the wheel pulses L and the course information, which are added in accordance with the method for composite locating. Since navigation devices of this type are known, a detailed description in connection with the present invention is unnecessary. However, it should be pointed out that with locating devices for land vehicles, assistance is frequently provided by means of stored road maps. In the course of this checks are made, for example, whether the respective location is still on a road and the locating result is correspondingly corrected. This is also possible in connection with location information obtained by means of the method of the invention; but the invention is not limited to such systems.

In addition to the distance traveled, the course change of the vehicle $d\alpha/dt$ is derived from the wheel pulses L, R generated by the sensors 3, 4 which, in respect to the digital signal processing, will be expressed in what follows as course change delta $\alpha$ between two scanning points. Because the wheel circumferences are different, the evaluation of the wheel pulses while the vehicle is moving straight ahead results in a circle with the radius r= B/(U/(U-delta U)−1). Here, r is the radius of the circle, B the axle width of the vehicle, U the circumference of one of the wheels and delta U the circumference error between the wheels. A circumference error of 1 mm results in a radius of 2.7 km, which results in an angular deviation of 1° after a travel distance of 47 m. Even with delta U= 0.3 mm, the radius r= 9 km, which corresponds to an error of 1° in 157 m. Therefore the wheel pulses L and R at 6 are corrected prior to calculating the angle or the course change in such a way that their average frequency during straight-ahead driving is the same. For this purpose the correcting unit 6 is controlled by an observation unit 7 as described hereinafter.

The smaller wheel which rolls over the same distance as a larger wheel supplies too many pulses. The pulses of the smaller wheel are added together by means of measuring intervals. After a pulse number to be determined, respectively one pulse is subtracted from the pulses of the smaller wheel. The pulse number IZ is $IZ = U_{kl}/(U_{gr}-U_{kl})$.

In a preferred embodiment, the wheel circumferences are determined in the course of calibration. The wheel circumferences are then known with an accuracy of 0.1 mm, for example. Through observation of straight path sections, a wheel circumference is suitably changed by 0.1 mm, for example, if necessary. IZ can again be determined with these new wheel circumferences. This modified or adapted wheel circumference, too, is processed as a function of speed. For this reason it is necessary to redefine IZ when the speed range is changed. The uncorrected course changes of the wheels are used for this observation in order to disconnect the adaptation processes.

A magnetic sensor 8 is used to determine whether there is a straight path, the output signal of which is also supplied to the observation unit 7. Although a magnetic sensor provides very undependable results particularly in a vehicle, it is however possible through steps described in connection with FIGS. 3 to 5 to carry out the formation of correction values, for example the pulse number IZ, in the case where the signal M is substantially undisturbed.

The corrected wheel pulses LC and RC are supplied by the correction device 6 to a device 9 for forming a course change signal delta $\alpha$. However, this value still is subject to different errors, which are not removed by only correcting the wheel pulses. Therefore another correction device 10 is provided, which is also controlled by the observation unit 7. This correction depends on the steering angle, i.e. the course change signal itself. In addition, the correction is made as a function of speed. For this reason the wheel pulses L are also supplied to the correction device 10. The output signals of the correction device 10 are supplied to the navigation device 5 and the observation device 7.

Only some essentials of the method of the invention will be described by means of the arrangement illustrated in FIG. 1. The method of the invention can comprise the following detailed steps:

correction of the pulses of the smaller wheel after determination of the circumferential difference between the wheels, determination of the direction of a course change, correction of the calculated course changes.

In the course of executing these method steps, measured values (wheel pulses, signal of the magnetic sensor) are observed over observation courses and are evaluated. If the evaluation shows that there is a driving situation which is suitable for forming a correction value, the respective correction value is formed from the measured values and stored. Then the stored correction values are used for correction until the driving situation permits the formation of another correction value for the same type of correction.

The present correction value is suitably not only simply replaced by a further correction value. On the one hand, erratic changes of the correction values are not expected, so that such changes lead to the conclusion that there were errors in detection. On the other hand, the above mentioned method steps form a plurality of control circuits intermeshed with each other which, for reason of stability, should have sufficient inertia. Thus, suitable averaging between the present and the further correction values is proper for attaining low-pass behavior.

The length of the observation courses is adapted to the requirements of the several method steps and depends on the vehicle speed. The importance of the dependence on speed of the length is explained by means of the following example. An observation course for determining straight-ahead driving, such as is required for determining the circumferential correction, should be as long as possible for attaining a high degree of accuracy. But as a rule, such long straight distances regularly only occur on superhighways, where driving is at high speeds. At low speeds which are almost exclusively used in city traffic, correction values would practically never be obtained with long observation courses. However, because of their dependence on speed, the observation courses in city traffic become so short that correction values can be determined over sufficiently short time periods.

Figure 2:
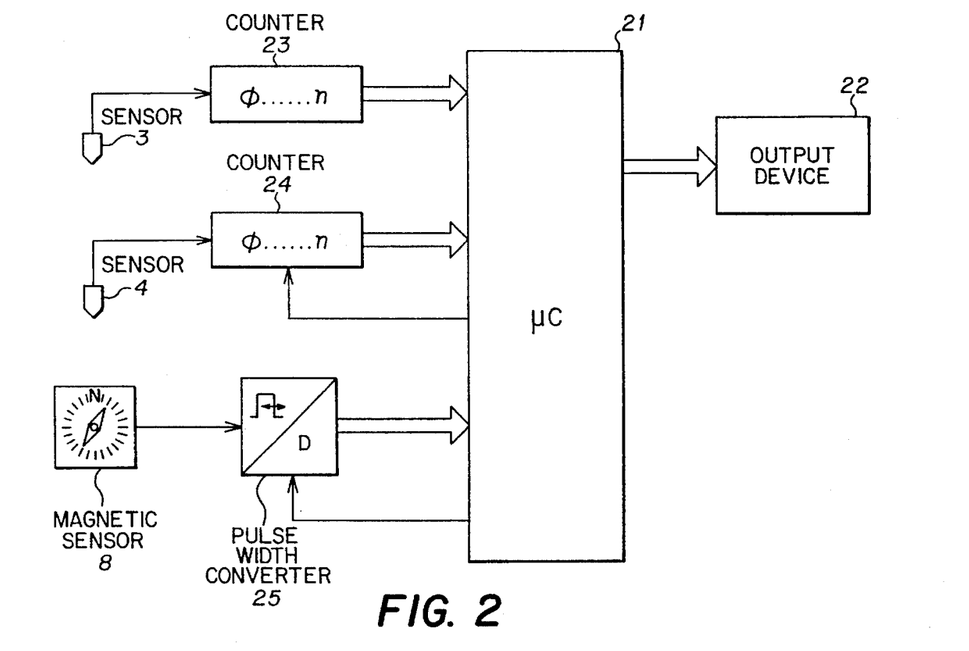

FIG. 2 shows an exemplary embodiment of an arrangement for executing the method of the invention in which, because of a high degree of integration, only a few components are required. The functions of the devices 6, 7, 9 and 10 shown in FIG. 1 are performed by a microcomputer 21 in the arrangement in accordance with FIG. 2. A suitable display device is provided as output device, for example an LCD display. The wheel pulses L and R of the sensors 3, 4 are respectively supplied to a counter 23, 24, the count of which is entered into the microcomputer 21 by means of a signal issued by the microcomputer 21. In an exemplary embodiment operated in actuality, the count was read in every 150 ms, after which the counter was returned to zero. For the course, a customary magnetic sensor 8 provides an angle $\alpha_M$ in the shape of a pulse-width modulated signal. By means of an appropriate converter 25 the pulse width is converted into a corresponding digital signal and entered regularly into the microcomputer 21.

Determination of Straight-ahead Driving.

Figure 3:
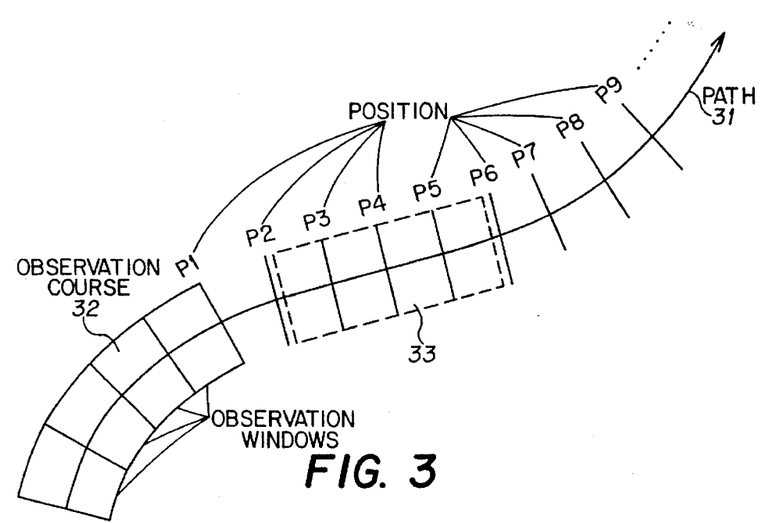

FIG. 3 schematically represents the path 31 of a vehicle. Individual positions P1 to P9 of the vehicle are indicated by cross strokes. The vehicle pulls an observation course after itself, so to speak, which has been boxed for the position P1. The observation course 32 consists of four observation windows F1 to F4, and the data collected while driving over the respective course (wheel pulses, course information of the magnetic sensor) are added up in each observation window. The observation windows F1 to F4 are operated in the form of a loop memory. When the vehicle arrives at the next position P2, the content of the oldest window is replaced by the data which had been added up in the meantime.

The respective course change delta $\alpha_M$ is stored in the observation windows for determining straight-ahead driving. The contents of the storage spaces assigned to the observation windows are shown for the positions P1 to P9 as a table in FIG. 4. The signal $\alpha_M$ of the magnetic sensor is interrogated repeatedly during an observation window, so that it is possible already to reduce a portion of the interference by means of the low-pass effect being generated. In addition, methods for processing the output signal of a magnetic sensor are known in accordance with which, in addition to the signal representing the course, a further signal is generated which takes the quality of the course signal into consideration. A method of this type is described in U.S. patent application P No. 36 44 683 of the present applicant.

Figure 4:
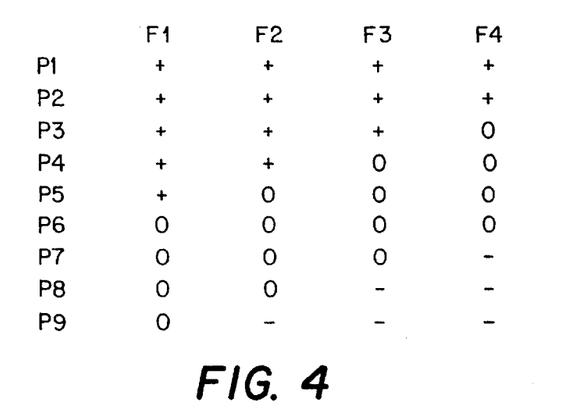

If the vehicle is in position P1, the observation windows are filled with positive values for delta $\alpha_M$, because the entire observation course is formed by a right-hand curve. This is also valid for position P2. But a straight line starts at this position, so that in the successive position P3 an observation window 4 is already filled with the value 0. However, in actuality no discrete values (+, 0, −) occur. This illustration was selected merely for the sake of clarity.

When the vehicle has reached the next position P4, the contents of two observation windows already are 0. At position P6 all four observation windows have the value 0. Therefore it is determined at this time that the vehicle has driven in a straight path over the observation course 33 shown in dashed lines in FIG. 3. A circumferential difference of the wheels can be calculated, a suitable correction value stored or the circumference of a wheel can be suitable changed from the respective simultaneously observed wheel pulses or from the difference between the wheel pulses.

An extensive utilization of the path sections which in general are suited for the respective observation becomes possible by means of splitting the observation course into individual observation windows and by cyclically processing them. If, for example, the signals of one observation course were to be evaluated and a new observation course were to be started then, an assured utilization of a short straight path would not be possible in the example in accordance with FIG. 3. The observation course in position P5 has another curved section, while the then following observation course in position P9 again contains curved sections.

Because the deviations of the effective wheel diameters depend, among other factors, on the vehicle speed, the correction values are respectively determined for individual speed ranges, and are stored and utilized. Here it has been shown to be advantageous to divide the occurring speeds into ranges of 30 km/h, wherein the first range extends to 40 km/h, so that the speeds usually maintained in city traffic fall into one range. As already mentioned, the observation course is switched as a function of the speed ranges, for example in a total range of 60 m to 800 m.

An observation is broken off, i.e. the observation windows are erased, when the limits of a speed range are exceeded, because the evaluation of signals of different speed ranges is not sensible. Also, an observation course is only continued, if a minimal speed (for example, loss of a wheel) is not downwardly exceeded, if delta $\alpha_M$ is less than 5°, for example, and if no sensor error has been detected. Such a one is present, for example, if the quality signal of the magnetic sensor or a plausibility test of the wheel pulses detects an error. For example, strong deviations of the wheel pulses L and R from each other suggest an error, because with even the narrowest curve radii the ratio of the wheel pulses cannot be greater than 1.5, for example.

Figure 5:
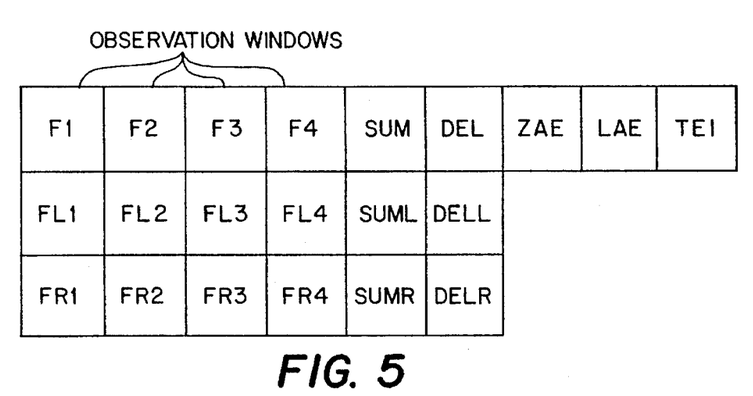

For further description of the derivation of correcting values for the wheel pulses, the most important values used in the course of observation have been compiled in the form of a table in FIG. 5. In this case the four observation windows F1 to F4 for the course change delta $\alpha_M$ have been complemented by observation windows FL1 to FL4 for the wheel pulses L and observation windows FR1 to FR4 for the wheel pulses R. A further value comprises the the sum of all "old" observation windows, while the values DEL, DELL and DELR respectively represent the value which is in summation, L, R, delta $\alpha_M$. The value ZAE indicates the respectively active observation window. The values LAE and TEI are used to set the length of the observation windows and thus of the observation course. For this purpose, TEI is set to a speed-dependent value and LAE is incremented until it is greater than TEI. In this case, the setting is LAE= LAE−TEI and DEL is stored in the observation window indicated by ZAE. ZAE is cyclically set forward, the new window sum SUM is formed and the value DEL is erased.

The sum formed from the observation windows and from the value DEL is subsequently evaluated. Thus, a past value of the maximum length of the product of the number of windows + 1 and the value TEI is always evaluated with small calculating effort.

Figure 6:
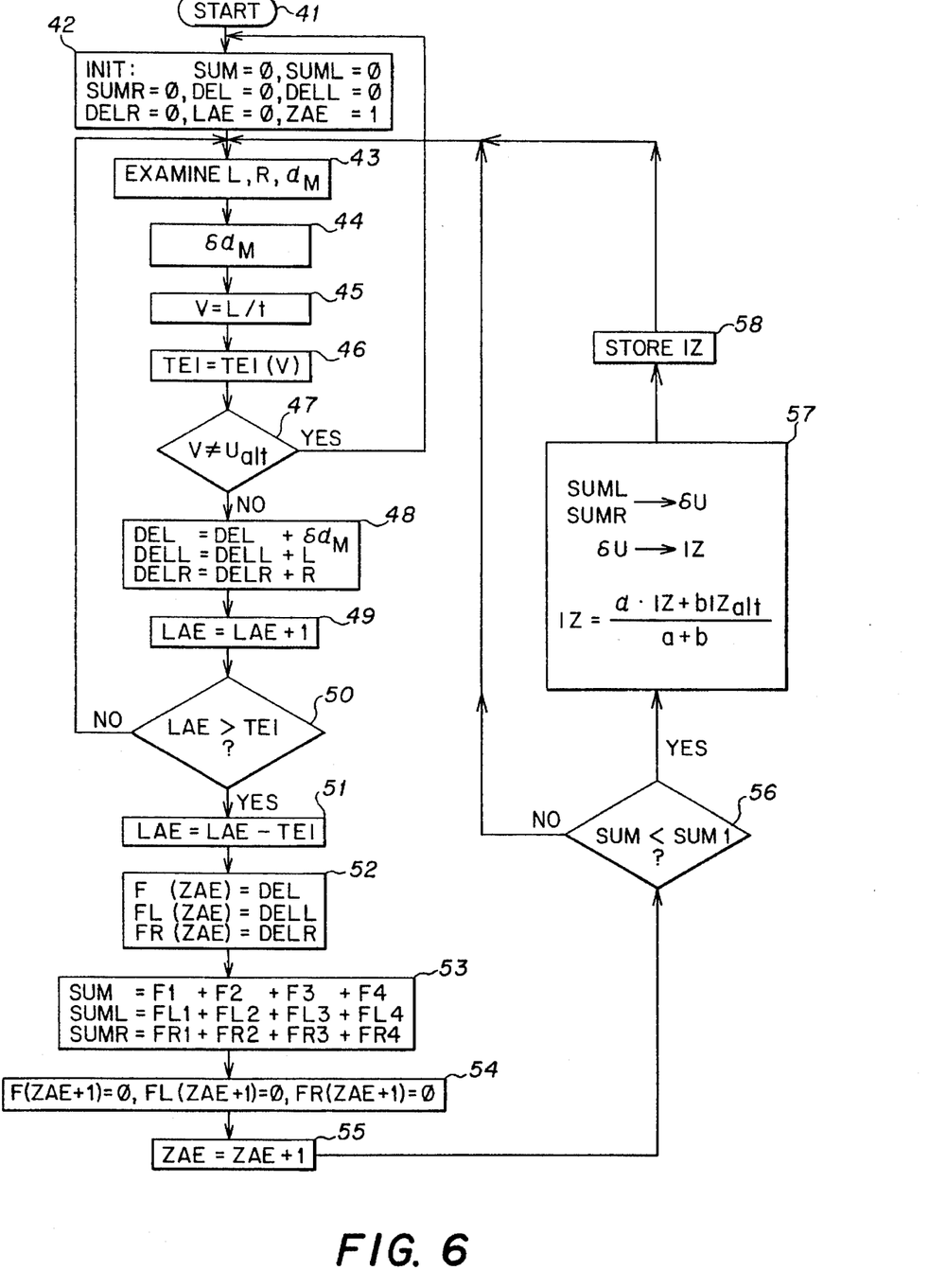

FIG. 6 shows a greatly simplified flow diagram of the program in the microcomputer 21 (FIG. 2) which is used for detecting straight-ahead driving and for determining the correction values for the correction of the wheel pulses. Starting at 41 is followed by initialization at 42, in which the values SUM, DEL and LAE are set to 0. ZAE is set to 1.

Then, at 43, an inquiry regarding the number of wheel pulses L, R and of the course $\alpha_M$ is made. Delta $\alpha_M$ is formed in the program section 44 by forming the difference with the inquiry in the previous program run. Following this, the speed v is calculated at 45 from the result of the inquiry of the wheel pulses L and at 46 the value TEI is read out from a memory as a function of the range in which the calculated speed v lies. To arrive at a more accurate speed calculation, it is possible to count the wheel pulses over several cycles of the program (scanning intervals), followed by a division by the number of cycles.

The program branches at 47, depending on whether the speed v has reached another range or whether there are other reasons for terminating the observation and beginning a new observation. If this is the case, new initialization is performed at 42. But if the vehicle still operated in the same speed range, the values DEL, DELL and DELR are increased in the following program section 48 by delta $\alpha_M$, L or R, respectively. The value LAE is also incremented at 49.

This is followed by branching at 50, depending on whether LAE is greater then TEI. If this is not (yet) the case, the program steps 43 to 49 are repeated. But if LAE is greater than TEI, processing of an observation window is terminated. Then LAE is set to LAE=LAE-TEI at 51. The values collected as the values DEL, DELL and DELR are assigned to the observation windows F, FL and FR, each of which is defined by ZAE (program section 52). In program section 53 the sums of respectively four observation windows are formed. Following this, the subsequent observation windows (ZAE= 1) are set to 0 at 54. After that ZAE is incremented at 55, in which case the value 0 follows a value 4.

At 56 the program is branched depending on whether SUM is smaller than a preset threshold value SUM1. By means of this it is determined in the course of processing each observation window whether there is straight-ahead driving. If SUM is not smaller than SUM1, the subsequent observation window is processed as described. But if SUM is smaller than SUM1, the diameter difference delta U, and from this the pulse number IZ, is calculated in program section 57 from the values SUML and SUMR. The pulse number IZ is averaged with the pulse number $IZ_{(k-1)}$ in the memory at 58 and the result is stored as correction value. This is then continuously available for correction, and when the pulse number $IZ_{(k)u}$ from the wheel pulses of the smaller wheel has been reached, one pulse is subtracted.

Determination of the Direction of the Course Change

To prevent mistakes and to adapt the correct parameters it is important to recognize during location determination if and in which direction the course changes—in other words, whether the operation is over straight distances, left or right curves. A sufficiently long observation course is necessary for this in order to also detect slight curves in the super-highway. For this, a vector number is used as criteria because of the equidistance (120 to 180 ms) of the detection over the speed range (for example 0 to 300 km/h). To obtain an evaluation independent of the number of teeth of the wheel sensor, ZAE= constant/UPu is determined for the observation course, where the constant is selected as 20.96, for example, and UPu is the number of pulses per revolution.

The differences between the already corrected wheel pulses LC and RC are collected over the observation course. If the result is a sum greater than 1, for example 2, the sign of the sum corresponds to the difference in direction. Slighter curves are clearly detected by this. But detection is delayed. In accordance with a further embodiment of the invention, a newly taken direction is detected more quickly in that the newly added pulse differences are examined for value and sign.

If they already correspond to the direction present on the observation course or if they are 0, they are processed. If, however, they have an opposite sign and a value equal to 0, they are taken into consideration once, because this might be the previously mentioned pulse correction. But if differences having the opposite sign and a value equal to 1 show up for a second time, the present values for the observation course are erased and a new observation course is started. In case of differences with the "wrong" sign and a value greater than 1, the present values are already being erased when this occurs for the first time, and a new observation is started.

Correction of the Detected Course Changes

Figure 7:
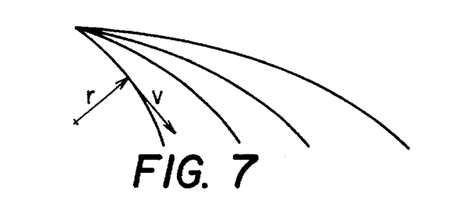

If the vehicle moves on a circular arc, the course change delta $\alpha$ is proportional to the angular speed omega with which the vehicle moves around the center (FIG. 7). The angular speed is a result of: omega= v/r, where v is the speed of the vehicle and r the radius of the curve. If the angular speed—as already briefly described in connection with FIG. 1—is calculated from the differences of the pulses L and R, the following connection applies: omega= k.delta l/delta t. Among others, the axle width is contained in the constant k.

However, the effective axle width is not constant, but depends on the steering angle, the speed and other factors. For this reason the angular speeds or course changes calculated from the differences in pulses are multiplied by factors which are detected, stored and applied in accordance with an adaptive method for several speed ranges, course change ranges and for both directions of course change. This method will be described in detail below by means of the flow diagram shown in FIG. 8.

After initial start-up at 61, initialization takes place at 62. Then the values delta $\alpha_M$ and delta $\alpha_C$ are observed in program section 63. Observation takes place in a manner similar to the observation for the purpose of detecting straight-ahead driving and for the purpose of circumferential correction of the wheels. For this reason details of the observation 63 are not shown in FIG. 8. Because of the greater differences between the pulses RC and LC it is possible to select a shorter observation course during cornering than during the observation of straight-ahead driving and observation of the direction of change. After the subsequent branching 64, the observation is continued until the observation window is full.

Figure 8:
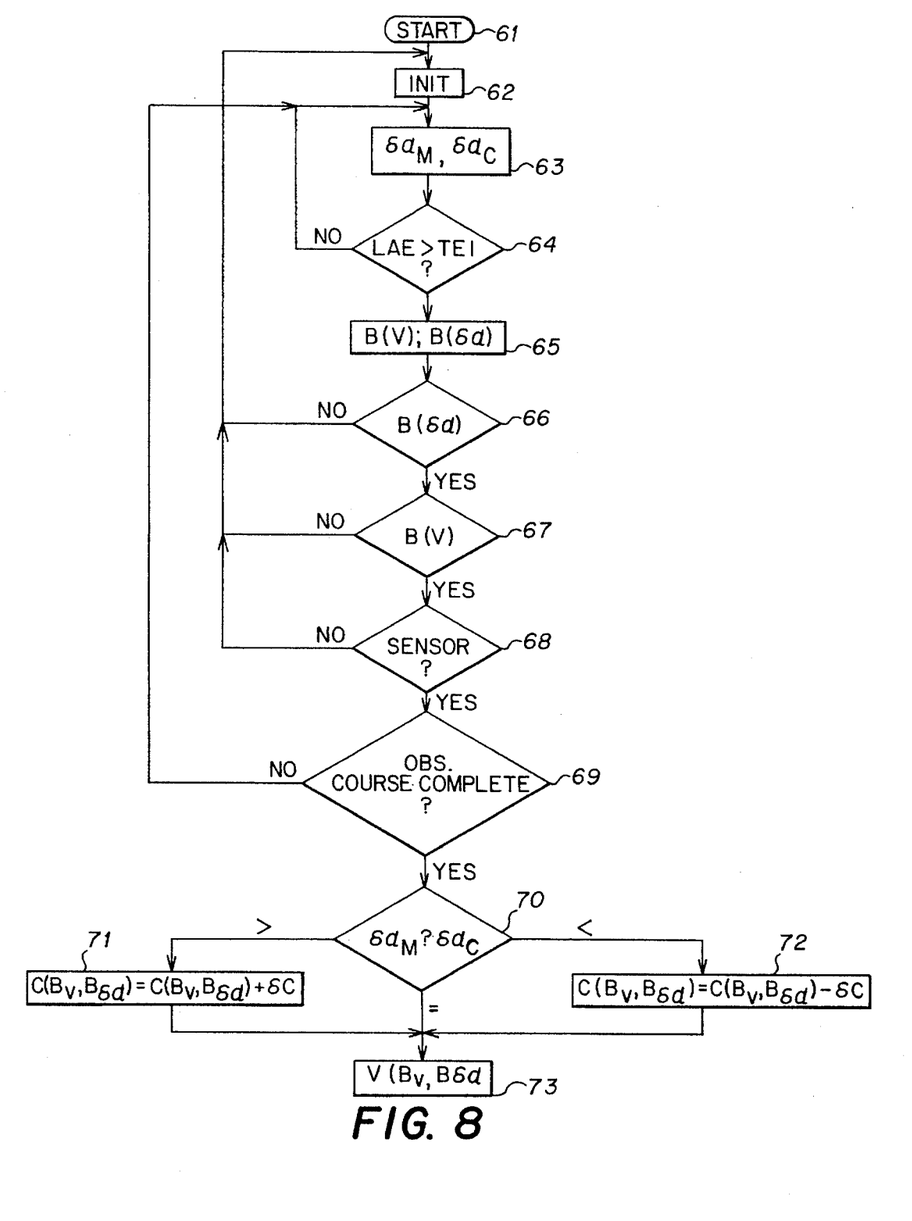

After that it is determined by means of a comparison with stored threshold values at 65 in which range delta $\alpha_C$ is located. It is then decided at 66 whether this range is still the same as in the previous observation window. If this is not the case, the observation must be terminated and the observation program must be re-initialized at 62. But if the course change or the curve radius is still in the same range, a check is subsequently made at 67 whether the speed is still in the previous range. If this is not the case, a new observation is also started. Otherwise a check is made at 68 whether there is a sensor error or not. This can take place, for example, by an evaluation of the quality signal of the magnetic sensor 8 (FIG. 1) or a plausability test of the wheel pulses.

If there is no sensor error, it is determined at 69 whether the observation course is complete. If this is not the case, observation is continued at 63. If, however, the observation course is complete, branching takes place at 70 depending on whether delta $\alpha_M$ is greater, equal to or less than delta $\alpha_C$. If delta $\alpha_M$ is greater than delta $\alpha_C$, the correction value C for the respectively determined range ($B_v$, $B_{delta\ \alpha}$) is increased by a preset value delta C at 71. If the two values for the course change are the same, C remains unchanged. Otherwise the correction value C is reduced at 72. C is stored at 73.

For the purpose of as exact as possible a correction it would be necessary to provide a division into many small ranges for the speed v as well as for the course change delta $\alpha$. However, driving situations suitable for correction within each one of these ranges then occur relatively seldom. The calculation effort is also increased. For this reason a compromise between the accuracy of the correction (number of ranges) and a sufficiently frequent correction has to be found for the respective use. In an arrangement realized in accordance with the invention, ten speed ranges and four course change ranges for respectively both directions of change were selected. Here, a non-linear division of the ranges for the course change delta $\alpha$ was made, because a driving situation with large course change values occurs less often and these ranges are otherwise very slowly learned. As limits, ⅛, ⅜ and ⅝ of the dynamic threshold value are for example possible, which is normalized in such a way that it is calculated as a whole number.

Figure 9:
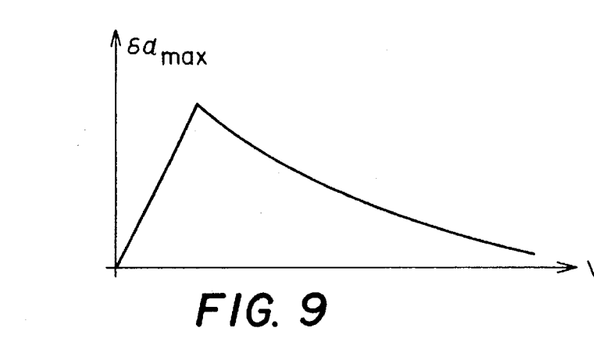

The course change values used in the end for composite locating are calculated in accordance with the formula: delta $\alpha_C$= delta $\alpha$.C($B_v$, $B_{delta\ \alpha}$). Because the detection of correction factors C in the limit ranges does not make sense when cornering, observation and thus adaptation of the correction factors C takes clearly place below the threshold value delta $\alpha_{max}$ of the course change delta $\alpha$. This threshold value is shown in FIG. 9 as a function of speed. The straight part applies to driving with the smallest possible curve radius (turning circle). At higher speeds the maximum course change delta $\alpha_{max}$ is reversely proportional to the speed. The curve shown in FIG. 9 only shows an absolute upper threshold delta $\alpha_{max}$ for values of delta $\alpha$ which can be evaluated.

Since the plurality of drivers virtually never reach the upper threshold ranges, within the framework of a further embodiment of the method of the invention the total range of the course change used for observation and adaptation is related to a dynamic threshold value which is continuously adapted and which normally lies below delta $\alpha_{max}$. This takes place in such a way that the dynamic threshold value is initiated at, for example, 50% of the mathematically possible value of a lateral acceleration of, for example, 4 m/sec$^2$ and is slightly increased in case of it being exceeded. In this case an increase by only a slight amount is made. In addition, sudden excesses of more than 25%, for example, are considered to be no longer valid, because this could be anti-lock breaking.

When dividing the speed ranges into sections, it is possible to state for every range a maximum expression for an expression which is proportional to the course change. For initialization, this value is inserted into a table of the dynamic values. Because of this, sensible learning is possible from the start, because each increase in the normalization value requires re-learning of the factors. To take driving dynamics into consideration, double this value is inserted into the table for threshold values. It represents a limit, which must never be exceeded.

Figure 10:
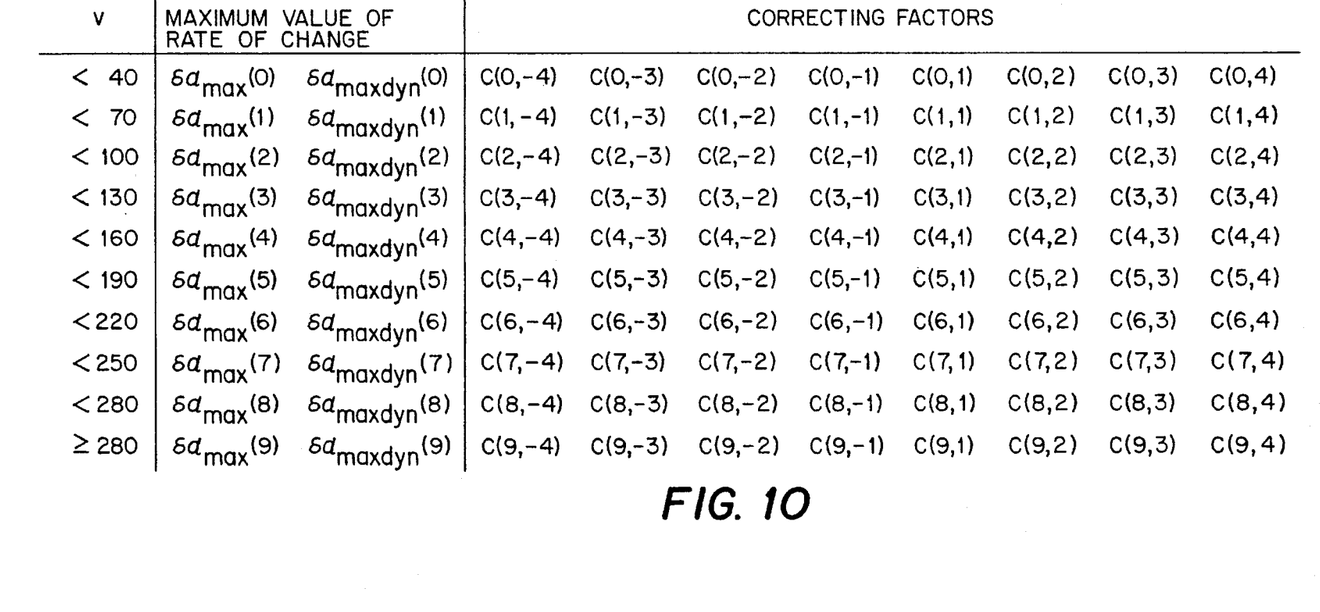

FIG. 10 shows a table of the correction factors for the course changes, which is actualized during each learning process and is continuously used for composite locating. In addition to the correcting factors C($B_v$, $B_{delta\ \alpha}$) for ten speed ranges $B_v$= 0 to 9 and eight course change ranges $B_{delta\ \alpha}$=1 to 4 and −1 to −4, absolute and dynamic threshold values delta $\alpha_{max}$, delta $\alpha_{maxdyn}$ for the course change have been entered into the table. A table of this type is stored in a non-volatile memory associated with the microcomputer 21 (FIG. 2) and is actualized as described during operation of the vehicle.

What is claimed is:

1. A method for correcting a course of a land vehicle in a navigation system wherein a driving distance and course changes are derived from wheel pulses generated by sensors in the course of revolution of wheels of a vehicle axle by respectively a preset angle, wherein the course changes derived from the wheel pulses are compared with comparison course changes which are detected with the aid of a magnetic sensor, and wherein correction factors are derived from the result of the comparison and stored, the method comprising the steps of:

observing the course changes and the comparison course changes over the course of an observation course driven by the vehicle, such that the observation course is greater at higher vehicle speeds than at lower vehicle speeds, calculating a difference between the course changes and the comparison course changes during course changes over said observation course which are greater than a preset minimum value, changing said stored correction factors to provide changed, stored correction factors, as follows:

increasing said stored correction factors if the course changes are less than the comparison course changes, and reducing the stored correction factors if the course changes are greater than the comparison course changes.

2. A method in accordance with claim 1, wherein the changed, stored correction factors for different driving operations are determined by at least one of a speed range and a course change range and further comprising the step of weighting a derived course change during a respective driving operation with the changed, stored correction factors.

3. A method in accordance with claim 2, further comprising the steps of:

determining limits of the course change ranges as fractions of a dynamic maximum value for the course change, and changing the dynamic maximum value by means of a learning process to maximum course changes occurring during the operation of the respective vehicle.

4. A method in accordance with claim 1, further comprising the step of separately deriving and storing the correction factors for both positive and negative signs of the course change.

5. A method in accordance with claim 1, further comprising the step of deriving a directional signal when the number of pulses of one of the wheels exceeds the number of pulses of the other wheel by at least 2 at the end of an observation course, in order to detect the direction of a course change of wheel pulses which have been corrected by increasing or decreasing the number of wheel pulses by 1, after a number of wheel pulses.

6. A method in accordance with claim 5, further comprising the step of adding differences between wheel pulses corresponding to the direction determined up to that time over an observation course, such that:

differences with opposite signs and an amount of one pulse are added at a first occurrence thereof the added differences are erased and a new observation course is started:

at a second occurrence of differences with opposite signs and an amount of one pulse or with differences of greater than one pulse.

7. A method in accordance with claim 1, further comprising the steps of:

deriving a correction value from a difference in a number of wheel pulses of both wheels during straight-ahead driving, storing the correction value and using the correction value for correction of the number of wheel pulses of at least one of the wheels.

8. A method for correcting a course of a land vehicle in a navigation system wherein a driving distance and course changes are derived from wheel pulses generated by sensors in the course of revolution of wheels of a vehicle axle by respectively a preset angle, wherein the course changes derived from the wheel pulses are compared with comparison course changes which are detected with the aid of a magnetic sensor, and wherein correction factors are derived from the result of the comparison and stored, the method comprising the steps of:

determining an observation course in accordance with travel speed of the vehicle, such that the observation course is greater at higher vehicle speeds than at lower vehicle speeds, observing the course changes and the comparison course changes over the course of the observation course driven by the vehicle, calculating a difference between the course changes and the comparison course changes during course changes over said observation course which are greater than a preset minimum value, changing said stored correction factors to provide changed, stored correction factors, as follows:

increasing said stored correction factors if the course changes are less than the comparison course changes, and reducing the stored correction factors if the course changes are greater than the comparison course changes, and the derivation of the correction factors takes place only with course changes which are located by at least a safety distance below a maximum course change determined by lateral guide forces of the wheels as a result of skidding of the vehicle.

9. A method for correcting a course of a land vehicle in a navigation system wherein a driving distance and course changes are derived from wheel pulses generated by sensors in the course of revolution of wheels of a vehicle axle by respectively a preset angle, wherein the course changes derived from the wheel pulses are compared with comparison course changes which are detected with the aid of a magnetic sensor, and wherein correction factors are derived from the result of the comparison and stored, the method comprising the steps of:

determining an observation course in accordance with travel speed of the vehicle, such that the observation course is greater at higher vehicle speeds than at lower vehicle speeds, the observation course having a length that is dependent on the vehicle speed and that in a range of approximately 40 to 70 km/h, the length of the observation course is made constant, observing the course changes and the comparison course changes over the course of the observation course driven by the vehicle, calculating a difference between the course changes and the comparison course changes during course changes over said observation course which are greater than a preset minimum value, changing said stored correction factors to provide changed, stored correction factors, as follows:

increasing said stored correction factors if the course changes are less than the comparison course changes, and reducing the stored correction factors if the course changes are greater than the comparison course changes.

10. A method for correcting a course of a land vehicle in a navigation system wherein a driving distance and course changes are derived from wheel pulses generated by sensors in the course of revolution of wheels of a vehicle axle by respectively a preset angle, wherein the course changes derived from the wheel pulses are compared with comparison course changes which are detected with the aid of a magnetic sensor, and wherein correction factors are derived from the result of the comparison and stored, the method comprising the steps of:

determining an observation course in accordance with travel speed of the vehicle, such that the observation course is greater at higher vehicle speeds than at lower vehicle speeds, observing the course changes and the comparison course changes over the course of the observation course driven by the vehicle, calculating a difference between the course changes and the comparison course changes during course changes over said observation course which are greater than a preset minimum value, changing said stored correction factors to provide changed, stored correction factors, as follows:

increasing said stored correction factors if the course changes are less than the comparison course changes, and reducing the stored correction factors if the course changes are greater than the comparison course changes, dividing the observation course into a preset number of observation windows, adding changes of course parameters detected during passage through the observation window in respectively one observation window, and terminating observation over an observation course started for one of the following:

(i) recognition of straight-ahead driving, (ii) recognition of a sign of a course change, and (iii) evaluation of cornering, and starting a new observation course if a sensor error has been detected.

11. A method for correcting a course of a land vehicle in a navigation system wherein a driving distance and course changes are derived from wheel pulses generated by sensors in the course of revolution of wheels of a vehicle axle by respectively a preset angle, Wherein the course changes derived from the wheel pulses are compared with comparison course changes which are detected with the aid of a magnetic sensor, and wherein correction factors are derived from the result of the comparison and stored, the method comprising the steps of:

determining an observation course in accordance with travel speed of the vehicle, such that the observation course is greater at higher vehicle speeds than at lower vehicle speeds, observing the course changes and the comparison course changes over the course of the observation course driven by the vehicle, calculating a difference between the course changes and the comparison course changes during course changes over said observation course which are greater than a preset minimum value, changing said stored correction factors to provide changed, stored correction factors, as follows:

increasing said stored correction factors if the course changes are less than the comparison course changes, and reducing the stored correction factors if the course changes are greater than the comparison course changes, checking measurement values of the comparison course changes for plausibility, and starting a new observation course in case of comparison course changes which have been recognized as being defective.

* * * * *